United States Patent
Zhang et al.

(10) Patent No.: US 10,207,949 B2
(45) Date of Patent: Feb. 19, 2019

(54) GLASS FIBER, COMPOSITION FOR PRODUCING THE SAME, AND COMPOSITE MATERIAL COMPRISING THE SAME

(71) Applicant: JUSHI GROUP CO., LTD., Tongxiang (CN)

(72) Inventors: Lin Zhang, Tongxiang (CN); Wenzhong Xing, Tongxiang (CN); Guorong Cao, Tongxiang (CN); Guijiang Gu, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 0 days.

(21) Appl. No.: 15/821,710

(22) Filed: Nov. 22, 2017

(65) Prior Publication Data

US 2018/0208497 A1   Jul. 26, 2018

Related U.S. Application Data

(63) Continuation-in-part of application No. PCT/CN2017/073447, filed on Feb. 14, 2017.

(30) Foreign Application Priority Data

Jan. 26, 2017   (CN) .......................... 2017 1 0057315

(51) Int. Cl.
  *C03C 13/00*   (2006.01)
  *C03C 3/095*   (2006.01)
  *C03C 3/087*   (2006.01)

(52) U.S. Cl.
  CPC .............. *C03C 13/00* (2013.01); *C03C 3/087* (2013.01); *C03C 3/095* (2013.01); *C03C 2213/00* (2013.01)

(58) Field of Classification Search
  CPC ....... C03C 13/00; C03C 3/095; C03C 13/046; C03C 3/087
  See application file for complete search history.

(56) References Cited

U.S. PATENT DOCUMENTS

| 2015/0018194 | A1* | 1/2015 | Li | ........................... C03C 13/00 501/38 |
| 2016/0068428 | A1* | 3/2016 | Li | ........................... C03C 13/00 501/38 |

FOREIGN PATENT DOCUMENTS

| CN | 102849958 B | 4/2015 |
| CN | 105392744 A | 3/2016 |
| CN | 105693100 A | 6/2016 |
| CN | 105731814 A | 7/2016 |
| CN | 105753329 A | 7/2016 |
| CN | 106007369 A | 10/2016 |
| CN | 106082639 A | 11/2016 |
| RU | 2129102 C1 | 4/1999 |
| RU | 2607331 C2 | 1/2017 |
| TW | 201615585 A | 5/2016 |
| WO | 2016165506 A2 | 10/2016 |
| WO | 2016165530 A2 | 10/2016 |
| WO | WO-2017197933 A2 * | 11/2017 ............. C03C 3/087 |

OTHER PUBLICATIONS

The World Intellectual Property Organization (WIPO) International Search Report for PCT/CN2017/073447 dated Oct. 31, 2017 4 Pages.
Written opinion dated Jan. 2, 2018 for PCT/CN2017/073447.

* cited by examiner

*Primary Examiner* — Elizabeth A. Bolden
(74) *Attorney, Agent, or Firm* — Anova Law Group, PLLC

(57) ABSTRACT

A composition for producing a glass fiber, including the following components with corresponding percentage amounts by weight: $SiO_2$: 57.1-61.4%; $Al_2O_3$: 17.1-21%; MgO: 10.1-14.5%; $Y_2O_3$: 1.1-4.3%; CaO: <6.5%; $Li_2O+Na_2O+K_2O$: ≤1%; $Li_2O$: ≤0.75%; $TiO_2$: <1.8%; and $Fe_2O_3$: 0.05-1.2%. The total weight percentage of the above components in the composition is greater than or equal to 98%. The weight percentage ratio of $Al_2O_3$ to $SiO_2$ is greater than or equal to 0.285. The invention also provides a glass fiber produced using the composition and a composite material including the glass fiber.

19 Claims, No Drawings

GLASS FIBER, COMPOSITION FOR PRODUCING THE SAME, AND COMPOSITE MATERIAL COMPRISING THE SAME

CROSS-REFERENCE TO RELATED APPLICATIONS

This application is a continuation-in-part of International Patent Application No. PCT/CN2017/073447 with an international filing date of Feb. 14, 2017, designating the United States, now pending, and further claims foreign priority to Chinese Patent Application No. 201710057315.3 filed Jan. 26, 2017. The contents of all of the aforementioned applications, including any intervening amendments thereto, are incorporated herein by reference.

BACKGROUND OF THE INVENTION

Field of the Invention

The present invention relates to a glass fiber, a composition for producing the same, and a composite material comprising the same.

Description of the Related Art

In general, the production of conventional glass fibers faces such difficulties as excessively high liquidus temperature of glass, excessively high rate of crystallization, high forming temperature, refining difficulty of molten glass and a narrow temperature range ($\Delta T$) for fiber formation. In addition, conventionally-produced glass fibers have relatively low strength and modulus.

SUMMARY OF THE INVENTION

It is one objective of the present disclosure to provide a composition for producing a glass fiber. The resulting glass fiber has relatively high strength and modulus, and relatively low crystallization rate and liquidus temperature; meanwhile, the composition for producing a glass fiber lowers the high temperature viscosity, forming temperature and bubbling ratio of the glass, all of which helps to reduce the energy consumption during production.

The composition for producing a glass fiber of the present invention is particularly suitable for large-scale production with refractory-lined furnaces.

To achieve the above objective, in accordance with one embodiment of the present disclosure, there is provided a composition for producing glass fiber, the composition comprising percentage amounts by weight, as follows:

| | |
|---|---|
| $SiO_2$ | 57.1-61.4%; |
| $Al_2O_3$ | 17.1-21%; |
| MgO | 10.1-14.5%; |
| $Y_2O_3$ | 1.1-4.3%; |
| CaO | <6.5%; |
| $Li_2O + Na_2O + K_2O$ | ≤1%; |
| $Li_2O$ | ≤0.75%; |
| $TiO_2$ | <1.8%; and |
| $Fe_2O_3$ | 0.05-1.2%. |

In addition, the combined weight percentage of the components listed above is greater than or equal to 98%, and the weight percentage ratio $C1=Al_2O_3/SiO_2$ is greater than or equal to 0.285.

In a class of this embodiment, the composition comprises the following components expressed as percentage amounts by weight:

| | |
|---|---|
| $SiO_2$ | 57.4-61.4%; |
| $Al_2O_3$ | 17.5-20.5%; |
| MgO | 10.1-14.5%; |
| $Y_2O_3$ | 2-4.2%; |
| CaO | ≤6.3%; |
| $Li_2O + Na_2O + K_2O$ | ≤1%; |
| $Li_2O$ | ≤0.75%; |
| $TiO_2$ | <1.4%; and |
| $Fe_2O_3$ | 0.05-1%. |

In addition, the combined weight percentage of the components listed above is greater than or equal to 98%, and the weight percentage ratio $C1=Al_2O_3/SiO_2$ is greater than or equal to 0.285.

In a class of this embodiment, the composition comprises the following components expressed as percentage amounts by weight:

| | |
|---|---|
| $SiO_2$ | 58-60.4%; |
| $Al_2O_3$ | 17.5-20.5%; |
| MgO | 10.3-14%; |
| $Y_2O_3$ | 2-4%; |
| CaO | 2-6%; |
| $Li_2O + Na_2O + K_2O$ | ≤1%; |
| $Li_2O$ | ≤0.75%; |
| $TiO_2$ | <1.4%; and |
| $Fe_2O_3$ | 0.05-1%. |

In addition, the combined weight percentage of the components listed above is greater than or equal to 98%, and the weight percentage ratio $C1=Al_2O_3/SiO_2$ is greater than or equal to 0.285.

In a class of this embodiment, the weight percentage ratio $C2=(Al_2O_3+MgO+Li_2O)/Y_2O_3$ is greater than or equal to 6.5.

In a class of this embodiment, the weight percentage ratio $C1=Al_2O_3/SiO_2$ is 0.289-0.357.

In a class of this embodiment, the weight percentage ratio $C3=(Y_2O_3+MgO)/SiO_2$ is greater than or equal to 0.2.

In a class of this embodiment, the content range of MgO is 10.3-14% in percentage amounts by weight.

In a class of this embodiment, the content range of MgO is greater than 11% but not greater than 13.5% in percentage amounts by weight.

In a class of this embodiment, the content range of MgO is 11.2-13.5% in percentage amounts by weight.

In a class of this embodiment, the composition contains one or more components selected from the group consisting of $CeO_2$, SrO, $La_2O_3$, ZnO, $B_2O_3$ and $ZrO_2$, with the combined weight percentages less than 2%.

In a class of this embodiment, the composition contains SrO in a content of 0-1.7% in percentage amounts by weight.

In a class of this embodiment, the composition contains $CeO_2$ in a content of 0-0.55% in percentage amounts by weight.

In a class of this embodiment, the total weight percentage of $Al_2O_3+MgO+Li_2O$ is greater than or equal to 28.1%.

In a class of this embodiment, the total weight percentage of $Al_2O_3+MgO+Li_2O$ is greater than or equal to 29.1%;

In a class of this embodiment, the weight percentage ratio of MgO/CaO is greater than or equal to 1.6.

In a class of this embodiment, the content range of $Li_2O$ is 0.05-0.7% in percentage amounts by weight.

In a class of this embodiment, the total weight percentage of $Li_2O+Na_2O+K_2O$ is 0.25-0.98%.

In a class of this embodiment, the composition comprises the following components expressed as percentage amounts by weight:

| | |
|---|---|
| $SiO_2$ | 57.4-61.4%; |
| $Al_2O_3$ | 17.5-20.5%; |
| MgO | 10.3-14%; |
| $Y_2O_3$ | 2-4%; |
| CaO | ≤6.3%; |
| $Li_2O + Na_2O + K_2O$ | ≤1%; |
| $Li_2O$ | ≤0.75%; |
| $TiO_2$ | <1.4%; and |
| $Fe_2O_3$ | 0.05-1%. |

In addition, the combined weight percentage of the components listed above is greater than or equal to 98%; the weight percentage ratio $C1=Al_2O_3/SiO_2$ is greater than or equal to 0.285; and the weight percentage ratio $C2=(Al_2O_3+MgO+Li_2O)/Y_2O_3$ is greater than or equal to 6.5.

In a class of this embodiment, the composition comprises the following components expressed as percentage amounts by weight:

| | |
|---|---|
| $SiO_2$ | 58-60.4%; |
| $Al_2O_3$ | 17.5-20.5%; |
| MgO | 10.5-14%; |
| $Y_2O_3$ | 2-4%; |
| CaO | 2-6%; |
| $Li_2O + Na_2O + K_2O$ | ≤1%; |
| $Li_2O$ | ≤0.75%; |
| $TiO_2$ | <1.4%; and |
| $Fe_2O_3$ | 0.05-1%; |

In addition, the combined weight percentage of the components listed above is greater than or equal to 98%; the weight percentage ratio $C1=Al_2O_3/SiO_2$ is greater than or equal to 0.285; the weight percentage ratio $C2=(Al_2O_3+MgO+Li_2O)/Y_2O_3$ is greater than or equal to 6.5; and the combined weight percentage of $Al_2O_3+MgO+Li_2O$ is greater than or equal to 28.1%.

In a class of this embodiment, the composition comprises the following components expressed as percentage amounts by weight:

| | |
|---|---|
| $SiO_2$ | 58-60.4%; |
| $Al_2O_3$ | 17.7-20.1%; |
| MgO | greater than 11% but not greater than 13.5%; |
| $Y_2O_3$ | 2-4%; |
| CaO | 2.3-5.8%; |
| $Li_2O + Na_2O + K_2O$ | ≤1%; |
| $Li_2O$ | 0.05-0.7%; |
| $TiO_2$ | <1.4%; and |
| $Fe_2O_3$ | 0.05-1%; |

In addition, the combined weight percentage of the components listed above is greater than or equal to 98%; the weight percentage ratio $C1=Al_2O_3/SiO_2$ is greater than or equal to 0.285; the weight percentage ratio $C2=(Al_2O_3+MgO+Li_2O)/Y_2O_3$ is greater than or equal to 6.5; and the combined weight percentage of $Al_2O_3+MgO+Li_2O$ is greater than or equal to 29.1%.

In a class of this embodiment, the content of $Y_2O_3$ is 2.3-3.9% in percentage amounts by weight.

In a class of this embodiment, the composition contains $La_2O_3$ in a content of 0-0.05% in percentage amounts by weight.

In a class of this embodiment, the composition comprises the following components expressed as percentage amounts by weight:

| | |
|---|---|
| $SiO_2$ | 57.4-61.4%; |
| $Al_2O_3$ | 17.5-20.5%; |
| MgO | 10.1-14.5%; |
| $Y_2O_3$ | 2-4.2%; |
| CaO | ≤6.3%; |
| $Li_2O + Na_2O + K_2O$ | ≤1%; |
| $Li_2O$ | ≤0.75%; |
| $TiO_2$ | <1.4%; |
| $Fe_2O_3$ | 0.05-1%; |
| $SrO + CeO_2 + F_2$ | <2%; |
| SrO | 0-1.7%; |
| $CeO_2$ | 0-0.55%; and |
| $F_2$ | 0-0.5%; |

In addition, the weight percentage ratio $C1=Al_2O_3/SiO_2$ is greater than or equal to 0.285, and the weight percentage ratio $C2=(Al_2O_3+MgO+Li_2O)/Y_2O_3$ is greater than or equal to 6.5.

According to another aspect of this invention, a glass fiber produced with the composition for producing a glass fiber is provided.

According to yet another aspect of this invention, a composite material incorporating the glass fiber is provided.

The main inventive points of the composition for producing a glass fiber according to this invention lie in that, by introducing high contents of $Y_2O_3$ and MgO, significantly reducing the content of CaO, controlling the content of alkali metal oxides and keeping tight control on the ratios of $Al_2O_3/SiO_2$, $(Al_2O_3+MgO+Li_2O)/Y_2O_3$ and $(Y_2O_3+MgO)/SiO_2$ respectively, while reasonably configuring the content ranges of $Al_2O_3$, $SiO_2$, $Y_2O_3$, MgO, $Li_2O$, CaO and $Al_2O_3+MgO+Li_2O$, utilizing the special compensation effect and accumulation effect of yttrium in the glass structure as well as the synergistic effect among the ions of yttrium, magnesium and lithium, and effectively controlling the Al/Si ratio and the rare earths content, the composition enables an appropriate amount of vacancies that leads to more orderly ion packing, more compact stacking structure of the glass and higher difficulty of ions reorganization and arrangement during the crystallization process. Therefore, the composition for producing a glass fiber of this invention significantly increases the glass strength and modulus, effectively reduces the glass crystallization rate, secures a desirable temperature range (ΔT) for fiber formation and enhances the refinement of molten glass, thus making it particularly suitable for high performance glass fiber production with refractory-lined furnaces.

Specifically, the composition for producing a glass fiber according to the present invention comprises the following components expressed as percentage amounts by weight:

| | |
|---|---|
| $SiO_2$ | 57.1-61.4%; |
| $Al_2O_3$ | 17.1-21%; |
| MgO | 10.1-14.5%; |
| $Y_2O_3$ | 1.1-4.3%; |
| CaO | <6.5%; |
| $Li_2O + Na_2O + K_2O$ | ≤1%; |
| $Li_2O$ | ≤0.75%; |
| $TiO_2$ | <1.8%; and |
| $Fe_2O_3$ | 0.05-1.2%; |

In addition, the combined weight percentage of the components listed above is greater than or equal to 98%, and the weight percentage ratio $C1=Al_2O_3/SiO_2$ is greater than or equal to 0.285.

The effect and content of each component in the composition for producing a glass fiber is described as follows:

$SiO_2$ is a main oxide forming the glass network and has the effect of stabilizing all the components. Too low of a $SiO_2$ content will affect the mechanical properties of the glass; too high of a content will cause the glass viscosity and liquidus temperature to be excessively high thereby resulting in difficulty for large-scale production. Therefore, in the composition for producing a glass fiber of the present invention, the content range of $SiO_2$ is 57.1-61.4%. Preferably, the $SiO_2$ content range can be 57.4-61.4%, more preferably 58-60.4%, and still more preferably greater than or equal to 58% but lower than 60%.

$Al_2O_3$ is another main oxide forming the glass network. When combined with $SiO_2$, it can have a substantive effect on the mechanical properties of the glass and a significant effect on preventing glass phase separation and on crystallization resistance. Too low of an $Al_2O_3$ content will make it impossible to obtain sufficiently high mechanical properties, especially modulus; too high of a content will significantly increase the risks of glass phase separation and crystallization. The content range of $Al_2O_3$ in this invention is 17.1-21%. Preferably, the $Al_2O_3$ content can be 17.5-20.5%, more preferably 17.7-20.1%. In addition, the sum of the weight percentages of $SiO_2+Al_2O_3$ can be 75.5-82%, which will not only ensure sufficiently high mechanical properties but also enable the large-scale production with refractory-lined furnaces at relatively low temperatures. Preferably, the sum of the weight percentages of $SiO_2+Al_2O_3$ can be 76-81%.

Meanwhile, the weight percentage ratio $C1=Al_2O_3/SiO_2$ is greater than or equal to 0.285, so that the glass can have higher mechanical properties and crystallization resistance as well as broader temperature range ($\Delta T$) for fiber formation. The present invention not only ensures an effective packing of aluminum ions and provide sufficient vacancies for rare earth ions with relatively big radiuses, and also minimizes the risk of formation of glass structural stress and further enhances the stacking effect of the glass structure. To achieve these desired features, preferably the range of the weight percentage ratio $C1=Al_2O_3/SiO_2$ can be 0.285-0.357, more preferably can be 0.289-0.357, even more preferably can be 0.291-0.353, and still even more preferably can be 0.294-0.346.

$Y_2O_3$ is an important rare earth oxide. The inventors find that a relatively high amount of $Y_2O_3$ contained in the glass composition of this invention would noticeably increase the glass strength and modulus and inhibit the glass crystallization. As the external ions at the gaps of the glass network, $Y^{3+}$ ions have large coordination numbers, high field strength and electric charge, and high accumulation capability. For these features, $Y^{3+}$ ions can help not only to improve the structural stability of the glass and increase the glass strength and modulus, but also effectively prevent the movement and arrangement of other ions to minimize the crystallization tendency of the glass. The inventors find from experiments that the above technical effects are not noticeable when a small amount of $Y_2O_3$ is introduced. Meanwhile, as $Y^{3+}$ ions have relatively big radiuses (0.09 nm) compared with those of $Al^{3+}$ (0.0535 nm), $Mg^{2+}$ (0.072 nm) and $Li^+$ (0.076 nm) ions, the introduced amount of $Y_2O_3$ exceeding a certain value would lead to insufficient vacanies for the big $Y^{3+}$ ions to fill, thus affecting the compact stacking of the glass structure and significantly increasing the glass density and structural stress. Therefore, in the composition for producing a glass fiber of this invention, the content range of $Y_2O_3$ is 1.1-4.3%, preferably 2-4.2%, more preferably 2-4%, and still more preferably 2.3-3.9%.

Additionally, in order to achieve a better structural stacking, further increase the glass strength and modulus and acquire a favorable glass density, the range of the weight percentage ratio $C2=(Al_2O_3+MgO+Li_2O)/Y_2O_3$ in this invention can be greater than or equal to 6.5, so that the proportions of the various ions with different radiuses can be effectively controlled for desired mechanical properties and compact stacking structure of the glass. Preferably, the range of the weight percentage ratio $C2=(Al_2O_3+MgO+Li_2O)/Y_2O_3$ can be greater than or equal to 7.0, and more preferably can be 7.2-15.

Furthermore, the range of the weight percentage ratio of $Al_2O_3+MgO+Li_2O$ can be greater than or equal to 28.1%, preferably greater than or equal to 28.6%, more preferably greater than or equal to 29.1%, and still more preferably greater than or equal to 29.6%.

In this invention, MgO and CaO mainly control the glass crystallization and regulate the glass viscosity and the rate of hardening of molten glass, and a high content of MgO has a favorable effect on the mechanical properties of the glass. With respect to the control of the glass crystallization and improvement of mechanical properties, the inventors have obtained unexpected effects by raising the MgO content and controlling the ratios of MgO/CaO and $(Y_2O_3+MgO)/SiO_2$. Relevant data shows that, for the conventional high-performance glass based on the MgO—CaO—$Al_2O_3$—$SiO_2$ system, where the content of CaO is relatively high, typically greater than 10% or even 12%, the crystal phases it contains after glass crystallization include mainly diopside ($CaMgSi_2O_6$) and anorthite ($CaAl_2Si_2O_8$). The competitive growth between these two crystals during the crystallization process is not so vigorous that no effective control of the crystallization rate can be achieved. Therefore, in this invention, the content of CaO is greatly reduced while the content of MgO is increased to create a shortage of CaO for crystallization, and consequently the crystal phases obtained after glass crystallization include mainly cordierite ($Mg_2Al_4Si_5O_8$) or a mixture of cordierite, enstatite ($MgSiO_3$) and anorthite, thereby effectively inhibiting the crystallization rate of the glass. At the same time, considering the differences of ionic radiuses and field strengths between $Y^{3+}$ ions and $Mg^{2+}$ ions, the ratios of each of these two ions to silica are rationally controlled, so that not only can a better effect of structural stacking be achieved, but also the movement and arrangement of $Mg^{2+}$ ions can be further impeded and hence the effect of inhibiting the crystalization rate is strengthened.

Therefore, in the composition for producing a glass fiber of the present invention, the content range of MgO can be 10.1-14.5%, preferably 10.3-14%, more preferably 10.5-14%, even more preferably greater than 11% but not greater than 13.5%, and still even more preferably 11.2-13.5%; the content range of CaO can be lower than 6.5%, preferably not greater than 6.3%, more preferably can be 2-6%, and still more preferably 2.3-5.8%; the range of the weight percentage ratio $C3=(Y_2O_3+MgO)/SiO_2$ can be greater than or equal to 0.2, preferably greater than or equal to 0.21, and more preferably greater than or equal to 0.23; and the range of the weight percentage ratio MgO/CaO can be greater than or equal to 1.6, preferably greater than or equal to 1.75, and more preferably greater than or equal to 1.9.

Both $K_2O$ and $Na_2O$ can reduce glass viscosity and are good fluxing agents. Compared with $Na_2O$ and $K_2O$, $Li_2O$ can significantly reduce glass viscosity thereby improving the glass melting performance. In addition, a small amount of $Li_2O$ provides considerable free oxygen, which helps more aluminum ions to form tetrahedral coordination, enhances the network structure of the glass and further improves the mechanical properties of glass. However, as too many alkali metal ions in the glass composition would affect the stability and corrosion resistance of the glass, the introduced amount should be limited. Therefore, in the composition for producing a glass fiber of the present invention, the content range of $Li_2O+Na_2O+K_2O$ is not greater than 1%, and the content range of $Li_2O$ is not greater than 0.75%. Preferably, the content range of $Li_2O$ is not greater than 0.7%, more preferably can be 0.05-0.7%, and still more preferably can be 0.1-0.65%. Preferably, the content range of $Li_2O+Na_2O+K_2O$ can be not greater than 0.98%, more preferably can be 0.25-0.98%, and still more preferably can be 0.3-0.95%. In addition, as both $K^+$ and $Na^+$ ions have relatively large radiuses (0.138 nm and 0.102 nm, respectively), when $Y_2O_3$ is introduced at a high amount, the sum of $Na_2O+K_2O$ should be limited so as not to affect the stacking effect of the glass structure. Therefore, the range of the weight percentage ratio $Na_2O+K_2O$ can be lower than 0.7%, preferably lower than 0.55%.

$TiO_2$ can not only reduce the glass viscosity at high temperature, but also has a certain fluxing effect. However, since titanium ions in combination with ferric ions can have a certain coloring effect, which will affect the appearance of glass fiber-reinforced articles, the introduced amount should be limited. Therefore, in the composition for producing a glass fiber of the present invention, the content range of $TiO_2$ is lower than 1.8%, preferably lower than 1.4%, and more preferably not greater than 0.8%.

$Fe_2O_3$ facilitates the melting of glass and can also improve the crystallization performance of glass. However, since ferric ions and ferrous ions have a coloring effect, the introduced amount should be limited. Therefore, in the composition for producing a glass fiber of the present invention, the content range of $Fe_2O_3$ is 0.05-1.2%, preferably 0.05-1%.

In addition, the composition for producing a glass fiber of the present invention can include small amounts of other components with a total content not greater than 2%. Furthermore, the composition for producing a glass fiber of the present invention can include one or more components with a total content not greater than 2% selected from the group consisting of $CeO_2$, SrO, $La_2O_3$, ZnO, $B_2O_3$ and $ZrO_2$. Furthermore, the composition for producing a glass fiber of the present invention can include one or more components with a total content not greater than 1% selected from the group consisting of $La_2O_3$, ZnO, $B_2O_3$ and $ZrO_2$. Furthermore, the composition for producing a glass fiber of the present invention can include SrO with a content range of 0-1.7%. Furthermore, the composition for producing a glass fiber of the present invention can include SrO with a content range of 0.1-1.3%. Furthermore, the composition for producing a glass fiber of the present invention can include either or both of the components $CeO_2$ and SrO with a total content not greater than 1.3%. Furthermore, the composition for producing a glass fiber of the present invention can include $CeO_2$ with a content range of 0-0.55%. Furthermore, the composition for producing a glass fiber of the present invention can include $CeO_2$ with a content range of 0-0.25%. Furthermore, the composition for producing a glass fiber of the present invention can include $F_2$ with a content range of 0-0.5% and generally in the form of impurities contained in the glass raw materials. Furthermore, the composition for producing a glass fiber of the present invention may not include $B_2O_3$ that is generally introduced in the form of impurities contained in the glass raw materials. Furthermore, the composition for producing a glass fiber of the present invention can include $La_2O_3$ with a content range of 0-0.05%

Furthermore, the composition for producing a glass fiber of the present invention includes $SiO_2$, $Al_2O_3$, MgO, $Y_2O_3$, CaO, $Li_2O$, $Na_2O$, $K_2O$, $TiO_2$, $Fe_2O_3$ and other components with a total content equaling to or greater than 99%. Furthermore, the composition for producing a glass fiber of the present invention includes $SiO_2$, $Al_2O_3$, MgO, $Y_2O_3$, CaO, $Li_2O$, $Na_2O$, $K_2O$, $TiO_2$, $Fe_2O_3$ and other components with a total content equaling to or greater than 99.5%.

In the composition for producing a glass fiber of the present invention, the beneficial effects produced by the aforementioned selected ranges of the components will be explained by way of examples through the specific experimental data.

The following are examples of preferred content ranges of the components contained in the composition for producing a glass fiber according to the present invention.

Composition 1

The high-performance composition for producing a glass fiber according to the present invention comprises the following components expressed as percentage amounts by weight:

| | |
|---|---|
| $SiO_2$ | 57.4-61.4% |
| $Al_2O_3$ | 17.5-20.5% |
| MgO | 10.1-14.5% |
| $Y_2O_3$ | 2-4.2% |
| CaO | ≤6.3% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%, and the weight percentage ratio $C1=Al_2O_3/SiO_2$ is greater than or equal to 0.285.

Composition 2

The high-performance composition for producing a glass fiber according to the present invention comprises the following components expressed as percentage amounts by weight:

| | |
|---|---|
| $SiO_2$ | 57.4-61.4% |
| $Al_2O_3$ | 17.5-20.5% |
| MgO | 10.1-14.5% |
| $Y_2O_3$ | 2-4.2% |
| CaO | ≤6.3% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%, SrO in an amount of 0-1.7% by weight is also present in the above composition, and the range of the weight percentage ratio $C1=Al_2O_3/SiO_2$ is 0.285-0.357.

Composition 3

The high-performance composition for producing a glass fiber according to the present invention comprises the following components expressed as percentage amounts by weight:

| | |
|---|---|
| $SiO_2$ | 57.4-61.4% |
| $Al_2O_3$ | 17.5-20.5% |
| MgO | 10.1-14.5% |
| $Y_2O_3$ | 2-4.2% |
| CaO | ≤6.3% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%, SrO in an amount of 0-1.7% by weight and $CeO_2$ in an amount of 0-0.55% by weight are also present in the above composition, and the range of the weight percentage ratio $C1=Al_2O_3/SiO_2$ is 0.285-0.357.

Composition 4

The high-performance composition for producing a glass fiber according to the present invention comprises the following components expressed as percentage amounts by weight:

| | |
|---|---|
| $SiO_2$ | 58-60.4% |
| $Al_2O_3$ | 17.5-20.5% |
| MgO | 10.3-14% |
| $Y_2O_3$ | 2-4% |
| CaO | 2-6% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%, and the range of the weight percentage ratio $C1=Al_2O_3/SiO_2$ is greater than or equal to 0.285.

Composition 5

The high-performance composition for producing a glass fiber according to the present invention comprises the following components expressed as percentage amounts by weight:

| | |
|---|---|
| $SiO_2$ | 57.4-61.4% |
| $Al_2O_3$ | 17.5-20.5% |
| MgO | 10.1-14.5% |
| $Y_2O_3$ | 2-4.2% |
| CaO | ≤6.3% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%, $CeO_2$ in an amount of 0-0.55% by weight is also present in the above composition, and the range of the weight percentage ratio $C1=Al_2O_3/SiO_2$ is 0.289-0.357.

Composition 6

The high-performance composition for producing a glass fiber according to the present invention comprises the following components expressed as percentage amounts by weight:

| | |
|---|---|
| $SiO_2$ | 57.4-61.4% |
| $Al_2O_3$ | 17.5-20.5% |
| MgO | 10.1-14.5% |
| $Y_2O_3$ | 2-4.2% |
| CaO | ≤6.3% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%; the range of the weight percentage ratio $C1=Al_2O_3/SiO_2$ is greater than or equal to 0.285; the range of the weight percentage ratio $C2=(Al_2O_3+MgO+Li_2O)/Y_2O_3$ is greater than or equal to 6.5; and the combined weight percentage of $Al_2O_3+MgO+Li_2O$ is greater than or equal to 28.1%.

Composition 7

The high-performance composition for producing a glass fiber according to the present invention comprises the following components expressed as percentage amounts by weight:

| | |
|---|---|
| $SiO_2$ | 57.4-61.4% |
| $Al_2O_3$ | 17.5-20.5% |
| MgO | 10.3-14% |
| $Y_2O_3$ | 2-4% |
| CaO | ≤6.3% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%; the range of the weight percentage ratio $C1=Al_2O_3/SiO_2$ is greater than or equal to 0.285; and the range of the weight percentage ratio $C2=(Al_2O_3+MgO+Li_2O)/Y_2O_3$ is greater than or equal to 6.5.

Composition 8

The high-performance composition for producing a glass fiber according to the present invention comprises the following components expressed as percentage amounts by weight:

| | |
|---|---|
| $SiO_2$ | 57.4-61.4% |
| $Al_2O_3$ | 17.5-20.5% |
| MgO | 10.5-14% |
| $Y_2O_3$ | 2-4% |
| CaO | ≤6.3% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%; the range of the weight percentage ratio $C1=Al_2O_3/SiO_2$ is 0.285-0.357; and the range of the weight percentage ratio $C2=(Al_2O_3+MgO+Li_2O)/Y_2O_3$ is greater than or equal to 7.0.

Composition 9

The high-performance composition for producing a glass fiber according to the present invention comprises the following components expressed as percentage amounts by weight:

| | |
|---|---|
| $SiO_2$ | 58-60.4% |
| $Al_2O_3$ | 17.5-20.5% |
| MgO | 10.5-14% |
| $Y_2O_3$ | 2-4% |
| CaO | 2-6% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%; the range of the weight percentage ratio $C1=Al_2O_3/SiO_2$ is greater than or equal to 0.285; the range of the weight percentage ratio $C2=(Al_2O_3+MgO+Li_2O)/Y_2O_3$ is greater than or equal to 6.5; and the combined weight percentage of $Al_2O_3+MgO+Li_2O$ is greater than or equal to 28.1%.

Composition 10

The high-performance composition for producing a glass fiber according to the present invention comprises the following components expressed as percentage amounts by weight:

| | |
|---|---|
| $SiO_2$ | 58-60.4% |
| $Al_2O_3$ | 17.5-20.5% |
| MgO | 10.3-14% |
| $Y_2O_3$ | 2-4% |
| CaO | 2-6% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%; the range of the weight percentage ratio $C1=Al_2O_3/SiO_2$ is 0.291-0.353; the range of the weight percentage ratio $C2=(Al_2O_3+MgO+Li_2O)/Y_2O_3$ is greater than or equal to 7.0; and the combined weight percentage of $Al_2O_3+MgO+Li_2O$ is greater than or equal to 28.1%.

Composition 11

The high-performance composition for producing a glass fiber according to the present invention comprises the following components expressed as percentage amounts by weight:

| | |
|---|---|
| $SiO_2$ | 58-60.4% |
| $Al_2O_3$ | 17.5-20.5% |
| MgO | greater than 11% but not greater than 13.5% |
| $Y_2O_3$ | 2-4% |
| CaO | 2-6% |
| $Li_2O + Na_2O + K_2O$ | ≤1% |
| $Li_2O$ | ≤0.75% |
| $TiO_2$ | <1.4% |
| $Fe_2O_3$ | 0.05-1% |

In addition, the combined weight percentage of the components listed above is greater than or equal to 98%; the range of the weight percentage ratio $C1=Al_2O_3/SiO_2$ is greater than or equal to 0.285; the range of the weight percentage ratio $C2=(Al_2O_3+MgO+Li_2O)/Y_2O_3$ is greater than or equal to 6.5; and the combined weight percentage of $Al_2O_3+MgO+Li_2O$ is greater than or equal to 28.1%.

Composition 12

The high-performance composition for producing a glass fiber according to the present invention comprises the following components expressed as percentage amounts by weight:

| | |
|---|---|
| $SiO_2$ | 58-60.4% |
| $Al_2O_3$ | 17.7-20.1% |
| MgO | greater than 11% but not greater than 13.5% |
| $Y_2O_3$ | 2.3-3.9% |
| CaO | 2.3-5.8% |
| $Li_2O + Na_2O + K_2O$ | ≤1% |
| $Li_2O$ | 0.05-0.7% |
| $TiO_2$ | <1.4% |
| $Fe_2O_3$ | 0.05-1% |

In addition, the combined weight percentage of the components listed above is greater than or equal to 98%; the range of the weight percentage ratio $C1=Al_2O_3/SiO_2$ is greater than or equal to 0.285; the range of the weight percentage ratio $C2=(Al_2O_3+MgO+Li_2O)/Y_2O_3$ is greater than or equal to 6.5; and the combined weight percentage of $Al_2O_3+MgO+Li_2O$ is greater than or equal to 29.1%.

Composition 13

The high-performance composition for producing a glass fiber according to the present invention comprises the following components expressed as percentage amounts by weight:

| | |
|---|---|
| $SiO_2$ | not lower than 58% but lower than 60% |
| $Al_2O_3$ | 17.7-20.1% |
| MgO | greater than 11% but not greater than 13.5% |
| $Y_2O_3$ | 2.3-3.9% |
| CaO | 2.3-5.8% |
| $Li_2O + Na_2O + K_2O$ | ≤1% |
| $Li_2O$ | 0.05-0.7% |
| $TiO_2$ | <1.4% |
| $Fe_2O_3$ | 0.05-1% |

In addition, the combined weight percentage of the components listed above is greater than or equal to 98%; the range of the weight percentage ratio $C1=Al_2O_3/SiO_2$ is greater than or equal to 0.285; the range of the weight percentage ratio $C2=(Al_2O_3+MgO+Li_2O)/Y_2O_3$ is greater than or equal to 7.0; and the combined weight percentage of $Al_2O_3+MgO+Li_2O$ is greater than or equal to 29.1%.

Composition 14

The high-performance composition for producing a glass fiber according to the present invention comprises the following components expressed as percentage amounts by weight:

| | |
|---|---|
| $SiO_2$ | 57.4-61.4% |
| $Al_2O_3$ | 17.5-20.5% |
| MgO | 10.1-14.5% |
| $Y_2O_3$ | 2-4.2% |
| CaO | ≤6.3% |
| $Li_2O + Na_2O + K_2O$ | ≤1% |
| $Li_2O$ | ≤0.75% |
| $TiO_2$ | <1.4% |
| $Fe_2O_3$ | 0.05-1% |
| $SrO + CeO_2 + F_2$ | <2% |
| SrO | 0-1.7% |
| $CeO_2$ | 0-0.55% |
| $F_2$ | 0-0.5% |

In addition, the range of the weight percentage ratio $C1=Al_2O_3/SiO_2$ is greater than or equal to 0.285, and the range of the weight percentage ratio $C2=(Al_2O_3+MgO+Li_2O)/Y_2O_3$ is greater than or equal to 6.5.

Composition 15

The high-performance composition for producing a glass fiber according to the present invention comprises the following components expressed as percentage amounts by weight:

| | |
|---|---|
| $SiO_2$ | 57.4-61.4% |
| $Al_2O_3$ | 17.5-20.5% |
| MgO | 10.3-14% |
| $Y_2O_3$ | 2-4.2% |
| CaO | ≤6.3% |
| $Li_2O + Na_2O + K_2O$ | ≤1% |
| $Li_2O$ | ≤0.75% |
| $TiO_2$ | <1.4% |
| $Fe_2O_3$ | 0.05-1% |
| $SrO + CeO_2 + F_2$ | <2% |
| SrO | 0-1.7% |
| $CeO_2$ | 0-0.55% |
| $F_2$ | 0-0.5% |

In addition, the range of the weight percentage ratio $C1=Al_2O_3/SiO_2$ is greater than or equal to 0.285; the range of the weight percentage ratio $C2=(Al_2O_3+MgO+Li_2O)/Y_2O_3$ is greater than or equal to 7.0; and the combined weight percentage of $Al_2O_3+MgO+Li_2O$ is greater than or equal to 28.1%.

DETAILED DESCRIPTION OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that the components of the composition for producing a glass fiber expressed as percentage amounts by weight are: 57.1-61.4% $SiO_2$, $_{17.1}$-21% $Al_2O_3$, 10.1-14.5% MgO, 1.1-4.3% $Y_2O_3$, lower than 6.5% CaO, not greater than 1% $Li_2O+Na_2O+K_2O$, not greater than 0.75% $Li_2O$, lower than 1.8% $TiO_2$ and 0.05-1.2% $Fe_2O_3$, wherein the range of the combined weight percentage of these components is greater than or equal to 98% and the range of the weight percentage ratio $C1=Al_2O_3/SiO_2$ is greater than or equal to 0.285. The composition can significantly increase the glass strength and modulus, effectively reduce the glass crystallization rate, secure a desirable temperature range ($\Delta T$) for fiber formation and enhance the refinement of molten glass, thus making it particularly suitable for high performance glass fiber production with refractory-lined furnaces.

The specific content values of $SiO_2$, $Al_2O_3$, $Y_2O_3$, CaO, MgO, $Li_2O$, $Na_2O$, $K_2O$, $Fe_2O_3$ and $TiO_2$ in the composition for producing a glass fiber of the present invention are selected to be used in the examples, and comparisons with S glass, traditional R glass and improved R glass are made in terms of the following seven property parameters, (1) Forming temperature, the temperature at which the glass melt has a viscosity of $10^3$ poise.

(2) Liquidus temperature, the temperature at which the crystal nucleuses begin to form when the glass melt cools off—i.e., the upper limit temperature for glass crystallization.

(3) $\Delta T$ value, which is the difference between the forming temperature and the liquidus temperature and indicates the temperature range at which fiber drawing can be performed.

(4) Elastic modulus, the modulus defining the ability of glass to resist elastic deformation, which is to be measured on bulk glass as per ASTM E1876.

(5) Tensile strength, the maximum tensile stress that the glass fiber can withstand, which is to be measured on impregnated glass roving as per ASTM D2343.

(6) Crystallization area ratio, to be determined in a procedure set out as follows: Cut the bulk glass appropriately to fit in with a porcelain boat trough and then place the cut glass bar sample into the porcelain boat. Put the porcelain boat with the glass bar sample into a gradient furnace for crystallization and keep the sample for heat preservation for 6 hours. Take the boat with the sample out of the gradient furnace and air-cool it to room temperature. Finally, examine and measure the amounts and dimensions of crystals on the surfaces of each sample within the temperature range of 1060-1130° C. from a microscopic view by using an optical microscope, and then calculate the area ratio of crystallization. A high area ratio would mean a high crystallization tendency and high crystallization rate.

(7) Amount of bubbles, to be determined in a procedure set out as follows: Use specific molds to compress the glass batch materials in each example into samples of same dimension, which will then be placed on the sample platform of a high temperature microscope. Heat the samples according to standard procedures up to the pre-set spatial temperature 1500° C. and then directly cool them off with the cooling hearth of the microscope to the ambient temperature without heat preservation. Finally, each of the glass samples is examined under a polarizing microscope to determine the amount of bubbles in the samples. A bubble is identified according to a specific amplification of the microscope.

The aforementioned seven parameters and the methods of measuring them are well-known to one skilled in the art. Therefore, these parameters can be effectively used to explain the properties of the composition for producing a glass fiber of the present invention.

The specific procedures for the experiments are as follows: Each component can be acquired from the appropriate raw materials. Mix the raw materials in the appropriate proportions so that each component reaches the final expected weight percentage. The mixed batch melts and the molten glass refines. Then the molten glass is drawn out through the tips of the bushings, thereby forming the glass fiber. The glass fiber is attenuated onto the rotary collet of a winder to form cakes or packages. Of course, conventional methods can be used to deep process these glass fibers to meet the expected requirement.

Comparisons of the property parameters of the examples of the composition for producing a glass fiber according to the present invention with those of the S glass, traditional R glass and improved R glass are further made below by way of tables, where the component contents of the composition for producing a glass fiber are expressed as weight percentage. What needs to be made clear is that the total amount of the components in the examples is slightly less than 100%, and it should be understood that the remaining amount is trace impurities or a small amount of components which cannot be analyzed.

TABLE 1A

|  |  | A1 | A2 | A3 | A4 | A5 | A6 | A7 |
|---|---|---|---|---|---|---|---|---|
| Component | $SiO_2$ | 59.50 | 59.50 | 59.50 | 58.85 | 58.85 | 58.85 | 58.85 |
|  | $Al_2O_3$ | 18.70 | 18.70 | 18.70 | 19.05 | 19.05 | 19.05 | 19.05 |
|  | CaO | 6.40 | 6.00 | 5.10 | 6.30 | 5.80 | 5.10 | 4.10 |
|  | MgO | 11.30 | 11.30 | 11.30 | 10.30 | 10.80 | 11.50 | 12.50 |
|  | $Y_2O_3$ | 1.80 | 2.30 | 3.20 | 3.40 | 3.40 | 3.40 | 3.40 |
|  | $Na_2O$ | 0.08 | 0.11 | 0.11 | 0.13 | 0.13 | 0.13 | 0.13 |
|  | $K_2O$ | 0.17 | 0.19 | 0.19 | 0.30 | 0.30 | 0.30 | 0.30 |
|  | $Li_2O$ | 0.70 | 0.65 | 0.65 | 0.47 | 0.47 | 0.47 | 0.47 |
|  | $Fe_2O_3$ | 0.39 | 0.45 | 0.45 | 0.47 | 0.47 | 0.47 | 0.47 |
|  | $TiO_2$ | 0.64 | 0.52 | 0.52 | 0.53 | 0.53 | 0.53 | 0.53 |
|  | $CeO_2$ | 0.12 | 0.08 | 0.08 | — | — | — | — |
| Ratio | C1 | 0.314 | 0.314 | 0.314 | 0.324 | 0.324 | 0.324 | 0.324 |
|  | C2 | 17.06 | 13.33 | 9.58 | 8.77 | 8.92 | 9.12 | 9.42 |
|  | C3 | 0.220 | 0.229 | 0.244 | 0.233 | 0.241 | 0.253 | 0.270 |
| Parameter | Forming temperature/° C. | 1304 | 1307 | 1309 | 1314 | 1311 | 1309 | 1306 |
|  | Liquidus temperature/° C. | 1218 | 1212 | 1207 | 1216 | 1211 | 1210 | 1217 |
|  | ΔT/° C. | 86 | 95 | 102 | 98 | 100 | 99 | 89 |
|  | Elastic modulus/GPa | 94.1 | 94.6 | 95.8 | 95.0 | 95.4 | 96.3 | 96.5 |
|  | Tensile strength/ MPa | 3310 | 3400 | 3530 | 3460 | 3490 | 3590 | 3630 |
|  | Crystallization area ratio/% | 19 | 15 | 9 | 11 | 10 | 7 | 9 |
|  | Amount of bubbles/pcs | 8 | 9 | 10 | 10 | 11 | 9 | 10 |

TABLE 1B

|  |  | A8 | A9 | A10 | A11 | A12 | A13 | A14 |
|---|---|---|---|---|---|---|---|---|
| Component | $SiO_2$ | 58.85 | 58.85 | 59.00 | 59.00 | 59.00 | 60.00 | 60.00 |
|  | $Al_2O_3$ | 19.05 | 19.05 | 18.80 | 18.80 | 18.80 | 18.30 | 17.70 |
|  | CaO | 3.10 | 2.80 | 6.00 | 5.30 | 4.40 | 2.00 | 4.90 |
|  | MgO | 13.50 | 14.00 | 11.10 | 11.40 | 12.00 | 12.40 | 11.70 |
|  | $Y_2O_3$ | 3.40 | 3.40 | 3.00 | 3.40 | 3.70 | 4.20 | 3.30 |
|  | $Na_2O$ | 0.13 | 0.14 | 0.14 | 0.14 | 0.14 | 0.10 | 0.15 |
|  | $K_2O$ | 0.30 | 0.31 | 0.30 | 0.30 | 0.30 | 0.28 | 0.20 |
|  | $Li_2O$ | 0.47 | 0.30 | 0.50 | 0.50 | 0.50 | 0.60 | 0.65 |
|  | $Fe_2O_3$ | 0.47 | 0.42 | 0.44 | 0.44 | 0.44 | 0.44 | 0.44 |
|  | $TiO_2$ | 0.53 | 0.53 | 0.52 | 0.52 | 0.52 | 0.48 | 0.46 |
|  | SrO | — | — | — | — | — | 1.00 | — |
|  | $ZrO_2$ | — | — | — | — | — | — | 0.30 |
| Ratio | C1 | 0.324 | 0.324 | 0.319 | 0.319 | 0.319 | 0.305 | 0.295 |
|  | C2 | 9.72 | 9.86 | 10.13 | 9.03 | 8.46 | 7.45 | 9.11 |
|  | C3 | 0.287 | 0.296 | 0.239 | 0.251 | 0.266 | 0.277 | 0.250 |
| Parameter | Forming temperature/° C. | 1304 | 1305 | 1309 | 1307 | 1303 | 1325 | 1310 |
|  | Liquidus temperature/° C. | 1219 | 1224 | 1211 | 1207 | 1206 | 1220 | 1213 |
|  | ΔT/° C. | 85 | 81 | 98 | 100 | 97 | 105 | 97 |
|  | Elastic modulus/ GPa | 95.7 | 95.2 | 95.1 | 96.0 | 97.3 | 96.8 | 95.6 |
|  | Tensile strength/ MPa | 3540 | 3500 | 3460 | 3540 | 3630 | 3670 | 3510 |
|  | Crystallization area ratio/% | 14 | 17 | 11 | 8 | 8 | 14 | 9 |
|  | Amount of bubbles/pcs | 9 | 8 | 10 | 9 | 9 | 10 | 9 |

TABLE 1C

|  |  | A15 | A16 | A17 | A18 | A19 | A20 | A21 |
|---|---|---|---|---|---|---|---|---|
| Component | $SiO_2$ | 58.00 | 57.10 | 59.10 | 58.40 | 58.90 | 60.40 | 61.40 |
|  | $Al_2O_3$ | 18.60 | 20.10 | 17.50 | 18.80 | 18.60 | 17.80 | 18.00 |
|  | CaO | 6.00 | 5.80 | 5.80 | 6.00 | 4.80 | 4.90 | 3.80 |
|  | MgO | 10.50 | 10.00 | 11.00 | 11.10 | 11.20 | 11.30 | 11.60 |
|  | $Y_2O_3$ | 4.30 | 4.00 | 3.70 | 3.50 | 3.20 | 3.30 | 2.90 |
|  | $Na_2O$ | 0.12 | 0.10 | 0.15 | 0.30 | 0.21 | 0.10 | 0.15 |
|  | $K_2O$ | 0.22 | 0.20 | 0.30 | 0.35 | 0.31 | 0.20 | 0.30 |
|  | $Li_2O$ | 0.60 | 0.64 | 0.50 | 0 | 0.38 | 0.65 | 0.55 |
|  | $Fe_2O_3$ | 0.46 | 0.46 | 0.45 | 0.45 | 0.44 | 0.46 | 0.44 |
|  | $TiO_2$ | 0.60 | 0.55 | 0.80 | 1.20 | 0.46 | 0.69 | 0.51 |
|  | SrO | 0.40 | 0.85 | 0.50 | 0.60 | 1.30 | — | — |
|  | $La_2O_3$ | — | — | — | — | — | — | 0.25 |
| Ratio | C1 | 0.321 | 0.352 | 0.296 | 0.322 | 0.316 | 0.295 | 0.293 |
|  | C2 | 6.91 | 7.69 | 7.84 | 8.54 | 9.43 | 9.02 | 10.40 |
|  | C3 | 0.255 | 0.245 | 0.249 | 0.250 | 0.244 | 0.242 | 0.236 |
| Parameter | Forming temperature/° C. | 1299 | 1301 | 1300 | 1305 | 1310 | 1317 | 1325 |
|  | Liquidus temperature/° C. | 1210 | 1200 | 1209 | 1212 | 1210 | 1227 | 1235 |
|  | ΔT/° C. | 90 | 101 | 91 | 93 | 100 | 90 | 90 |
|  | Elastic modulus/GPa | 96.3 | 96.0 | 95.5 | 96.1 | 96.5 | 95.1 | 94.9 |
|  | Tensile strength/MPa | 3560 | 3460 | 3480 | 3500 | 3540 | 3460 | 3430 |
|  | Crystallization area ratio/% | 7 | 13 | 8 | 9 | 11 | 16 | 19 |
|  | Amount of bubbles/pcs | 6 | 7 | 8 | 7 | 8 | 10 | 12 |

TABLE 1D

|  |  | A22 | A23 | A24 | A25 | S glass | Traditional R glass | Improved R glass |
|---|---|---|---|---|---|---|---|---|
| Component | $SiO_2$ | 57.40 | 60.00 | 59.50 | 58.80 | 65 | 60 | 60.75 |
|  | $Al_2O_3$ | 20.50 | 19.00 | 18.40 | 18.70 | 25 | 25 | 15.80 |
|  | CaO | 4.10 | 3.90 | 4.90 | 5.30 | — | 9 | 13.90 |
|  | MgO | 11.50 | 11.80 | 11.20 | 12.10 | 10 | 6 | 7.90 |
|  | $Y_2O_3$ | 3.90 | 3.10 | 3.40 | 3.20 | — | — | — |
|  | $Na_2O$ | 0.08 | 0.12 | 0.12 | 0.15 | trace amount | trace amount | 0.73 |
|  | $K_2O$ | 0.12 | 0.21 | 0.31 | 0.23 | trace amount | trace amount | — |
|  | $Li_2O$ | 0.75 | 0.60 | 0.50 | 0.50 | — | — | 0.48 |
|  | $Fe_2O_3$ | 0.46 | 0.45 | 0.45 | 0.44 | trace amount | trace amount | 0.18 |
|  | $TiO_2$ | 0.34 | 0.62 | 0.52 | 0.48 | trace amount | trace amount | 0.12 |
|  | SrO | 0.55 | — | 0.70 | — | — | — | — |
|  | $CeO_2$ | — | — | 0.05 | 0.10 | — | — | — |
| Ratio | C1 | 0.357 | 0.317 | 0.309 | 0.318 | 0.385 | 0.385 | 0.260 |
|  | C2 | 8.40 | 10.13 | 8.85 | 9.78 | — | — | — |
|  | C3 | 0.268 | 0.248 | 0.245 | 0.260 | 0.154 | 0.100 | 0.130 |
| Parameter | Forming temperature/° C. | 1306 | 1321 | 1306 | 1303 | 1571 | 1430 | 1278 |
|  | Liquidus temperature/° C. | 1212 | 1216 | 1206 | 1205 | 1470 | 1350 | 1210 |
|  | ΔT/° C. | 94 | 105 | 100 | 98 | 101 | 80 | 68 |
|  | Elastic modulus/GPa | 96.3 | 95.6 | 95.2 | 95.8 | 90 | 89 | 88 |
|  | Tensile strength/MPa | 3560 | 3490 | 3460 | 3530 | 3460 | 2750 | 2500 |

TABLE 1D-continued

|  | A22 | A23 | A24 | A25 | S glass | Traditional R glass | Improved R glass |
|---|---|---|---|---|---|---|---|
| Crystallization area ratio/% | 14 | 10 | 8 | 9 | 100 | 70 | 35 |
| Amount of bubbles/pcs | 8 | 11 | 7 | 8 | 40 | 30 | 25 |

It can be seen from the values in the above tables that, compared with the S glass, the composition for producing a glass fiber of the present invention has the following advantages: (1) much higher elastic modulus; (2) much lower liquidus temperature and much lower crystallization area ratio, which indicate a low upper limit temperature for crystallization as well as a low crystallization rate and thus help to reduce the crystallization risk and increase the fiber drawing efficiency; and (3) smaller amount of bubbles, which indicates a better refining of molten glass.

In addition, compared with the traditional R glass and improved R glass, the composition for producing a glass fiber of the present invention has the following advantages: (1) much higher elastic modulus and strength; (2) much lower crystallization area ratio, which indicate a low crystallization rate and thus helps to reduce the crystallization risk and increase the fiber drawing efficiency; and (3) smaller amount of bubbles, which indicates a better refining of molten glass.

Both S glass and traditional R glass cannot enable the achievement of large-scale production with refractory-lined furnaces and, with respect to improved R glass, part of the glass properties is compromised to reduce the liquidus temperature and forming temperature, so that the production difficulty is decreased and the production with refractory-lined furnaces could be achieved. By contrast, the composition for producing a glass fiber of the present invention not only has a sufficiently low liquidus temperature, forming temperature and crystallization rate which enable the production with refractory-lined furnaces, but also significantly increases the glass modulus and strength, thereby resolving the technical bottleneck that the modulus and strength of S glass fiber cannot be improved with the growth of production scale.

Therefore, it can be seen from the above that, compared with the current main-stream high-performance glasses, the composition for producing a glass fiber of the present invention has made a breakthrough in terms of elastic modulus, strength, crystallization rate and refining performance of the glass, with significantly improved modulus and strength, remarkably reduced crystallization rate and relatively small amount of bubbles under the same conditions. Thus, the overall technical solution of the present invention enables an easy achievement of large-scale production with refractory-lined furnaces.

The composition for producing a glass fiber according to the present invention can be used for making glass fibers having the aforementioned properties.

The composition for producing a glass fiber according to the present invention in combination with one or more organic and/or inorganic materials can be used for preparing composite materials having improved characteristics, such as glass fiber reinforced base materials.

The composition for producing a glass fiber of the present invention not only results in glass fiber having a sufficiently low liquidus temperature, forming temperature and crystallization rate which enable the production with refractory-lined furnaces, but also significantly increases the glass modulus and strength of the glass fibers, thereby resolving the technical bottleneck that the modulus and strength of S glass fiber cannot be improved with the enhanced production scale. Compared with the current main-stream high-performance glasses, the composition for producing a glass fiber of the present invention has made a breakthrough in terms of elastic modulus, strength, crystallization rate and refining performance of the glass, with significantly improved modulus and strength, remarkably reduced crystallization rate and relatively small amount of bubbles under the same conditions. Thus, the overall technical solution of the present invention enables an easy achievement of large-scale production with refractory-lined furnaces.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A composition for producing a glass fiber, comprising the following components with corresponding percentage amounts by weight:

| | |
|---|---|
| $SiO_2$ | 57.1-61.4%; |
| $Al_2O_3$ | 17.1-21%; |
| MgO | 10.1-14.5%; |
| $Y_2O_3$ | 1.1-4.3%; |
| CaO | <6.5%; |
| $Li_2O + Na_2O + K_2O$ | ≤1%; |
| $Li_2O$ | ≤0.75%; |
| $TiO_2$ | <1.8%; and |
| $Fe_2O_3$ | 0.05-1.2%; | wherein
a total weight percentage of the above components is greater than or equal to 98%; and
a weight percentage ratio $Al_2O_3/SiO_2$ is greater than or equal to 0.305, and
a weight percentage ratio $(Al_2O_3+MgO+Li_2O)/Y_2O_3$ is greater than or equal to 7.45.

2. The composition of claim 1, comprising 10.3-14 wt. % of MgO.

3. The composition of claim 1, wherein a weight percentage of MgO is greater than 11% and less than or equal to 13.5%.

4. The composition of claim 1, comprising 0.05-0.7 wt. % of $Li_2O$.

5. The composition of claim 1, wherein a total weight percentage of $Y_2O_3$ 2.3-3.9%.

6. The composition of claim 1, wherein a total weight percentage of $Li_2O+Na_2O+K_2O$ is 0.25%-0.98%.

7. The composition of claim 1, wherein a total weight percentage of $Al_2O_3+MgO+Li_2O$ is greater than or equal to 28.1%.

8. The composition of claim 1, further comprising no more than 2 wt. % of $CeO_2$, SrO, $La_2O_3$, ZnO, $B_2O_3$, $ZrO_2$, or a mixture thereof.

9. The composition of claim 1, wherein a weight percentage ratio $Al_2O_3/SiO_2$ is 0.305-0.357.

10. The composition of claim 1, wherein a weight percentage ratio MgO/CaO is greater than or equal to 1.6.

11. The composition of claim 1, wherein a weight percentage ratio $(Y_2O_3+MgO)/SiO_2$ is greater than or equal to 0.2.

12. The composition of claim 1, comprising the following components with corresponding percentage amounts by weight:

| | |
|---|---|
| $SiO_2$ | 57.4-61.4%; |
| $Al_2O_3$ | 17.5-20.5%; |
| MgO | 10.1-14.5%; |
| $Y_2O_3$ | 2-4.2%; |
| CaO | ≤6.3%; |
| $Li_2O + Na_2O + K_2O$ | ≤1%; |
| $Li_2O$ | ≤0.75%; |
| $TiO_2$ | <1.4%; and |
| $Fe_2O_3$ | 0.05-1%; | wherein
   a total weight percentage of the above components is greater than or equal to 98%; and
   a weight percentage ratio $Al_2O_3/SiO_2$ is greater than or equal to 0.305.

13. The composition of claim 1, comprising the following components with corresponding percentage amounts by weight:

| | |
|---|---|
| $SiO_2$ | 58-60.4% |
| $Al_2O_3$ | 17.5-20.5% |
| MgO | 10.3-14% |
| $Y_2O_3$ | 2-4% |
| CaO | 2-6% |
| $Li_2O + Na_2O + K_2O$ | ≤1% |
| $Li_2O$ | ≤0.75% |
| $TiO_2$ | <1.4% |
| $Fe_2O_3$ | 0.05-1%; | wherein
   a total weight percentage of the above components is greater than or equal to 98%; and
   a weight percentage ratio $Al_2O_3/SiO_2$ is greater than or equal to 0.305.

14. The composition of claim 1, comprising the following components with corresponding percentage amounts by weight:

| | |
|---|---|
| $SiO_2$ | 57.4-61.4%; |
| $Al_2O_3$ | 17.5-20.5%; |
| MgO | 10.3-14%; |
| $Y_2O_3$ | 2-4%; |
| CaO | ≤6.3%; |
| $Li_2O + Na_2O + K_2O$ | ≤1%; |
| $Li_2O$ | ≤0.75%; |
| $TiO_2$ | <1.4%; and |
| $Fe_2O_3$ | 0.05-1%; | wherein
   a total weight percentage of the above components is greater than or equal to 98%;
   a weight percentage ratio $Al_2O_3/SiO_2$ is greater than or equal to 0.305; and
   a weight percentage ratio $(Al_2O_3+MgO+Li_2O)/Y_2O_3$ is greater than or equal to 7.45.

15. The composition of claim 1, comprising the following components with corresponding percentage amounts by weight:

| | |
|---|---|
| $SiO_2$ | 58-60.4%; |
| $Al_2O_3$ | 17.5-20.5%; |
| MgO | 10.5-14%; |
| $Y_2O_3$ | 2-4%; |
| CaO | 2-6%; |
| $Li_2O + Na_2O + K_2O$ | ≤1%; |
| $Li_2O$ | ≤0.75%; |
| $TiO_2$ | <1.4%; and |
| $Fe_2O_3$ | 0.05-1%; | wherein
   a total weight percentage of the above components is greater than or equal to 98%;
   a weight percentage ratio $Al_2O_3/SiO_2$ is greater than or equal to 0.305;
   a weight percentage ratio $(Al_2O_3+MgO+Li_2O)/Y_2O_3$ is greater than or equal to 7.45; and
   a total weight percentage of $Al_2O_3+MgO+Li_2O$ is greater than or equal to 28.1%.

16. The composition of claim 1, comprising the following components with corresponding percentage amounts by weight:

| | |
|---|---|
| $SiO_2$ | 58-60.4%; |
| $Al_2O_3$ | 17.7-20.1%; |
| MgO | greater than 11% but not greater than 13.5%; |
| $Y_2O_3$ | 2-4%; |
| CaO | 2.3-5.8%; |
| $Li_2O + Na_2O + K_2O$ | ≤1%; |
| $Li_2O$ | 0.05-0.7%; |
| $TiO_2$ | <1.4%; and |
| $Fe_2O_3$ | 0.05-1%; | wherein
   a total weight percentage of the above components is greater than or equal to 98%;
   a weight percentage ratio $Al_2O_3/SiO_2$ is greater than or equal 0.305;
   a weight percentage ratio $(Al_2O_3+MgO+Li_2O)/Y_2O_3$ is greater than or equal to 7.45; and
   a total weight percentage of $Al_2O_3+MgO+Li_2O$ is greater than or equal to 29.1%.

17. The composition of claim 1, comprising the following components with corresponding percentage amounts by weight:

| | |
|---|---|
| $SiO_2$ | 57.4-61.4%; |
| $Al_2O_3$ | 17.5-20.5%; |
| MgO | 10.1-14.5%; |

-continued

| | |
|---|---|
| $Y_2O_3$ | 2-4.2%; |
| CaO | ≤6.3%; |
| $Li_2O + Na_2O + K_2O$ | ≤1%; |
| $Li_2O$ | ≤0.75%; |
| $TiO_2$ | <1.4%; |
| $Fe_2O_3$ | 0.05-1%; |
| $SrO + CeO_2 + F_2$ | <2%; |
| SrO | 0-1.7%; |
| $CeO_2$ | 0-0.55%; and |
| $F_2$ | 0-0.5%; | wherein
 a weight percentage ratio $Al_2O_3/SiO_2$ is greater than or equal to 0.305; and
 a weight percentage ratio $(Al_2O_3+MgO+Li_2O)/Y_2O_3$ is greater than or equal to 7.45.

18. A glass fiber, being produced using the composition of claim 1.

19. A composite material, comprising the glass fiber of claim 18.

* * * * *